(12) United States Patent
Jacumet

(10) Patent No.: US 9,781,310 B2
(45) Date of Patent: Oct. 3, 2017

(54) MOTION PICTURE CAMERA ARRANGEMENT AND METHOD OF OPERATING A MOTION PICTURE CAMERA ARRANGEMENT

(71) Applicant: Arnold & Richter Cine Technik GmbH & Co. Betriebs KG, Munich (DE)

(72) Inventor: Klaus Jacumet, München (DE)

(73) Assignee: Arnold & Richter Cine Technik GmbH & Co., Betriebs KG, Munich (DE)

( * ) Notice: Subject to any disclaimer, the term of this patent is extended or adjusted under 35 U.S.C. 154(b) by 138 days.

(21) Appl. No.: 14/631,014

(22) Filed: Feb. 25, 2015

(65) Prior Publication Data

US 2015/0249775 A1 Sep. 3, 2015

(30) Foreign Application Priority Data

Feb. 28, 2014 (DE) ........................ 10 2014 102 689

(51) Int. Cl.
| | |
|---|---|
| *H04N 5/222* | (2006.01) |
| *H04N 5/232* | (2006.01) |
| *H04N 5/783* | (2006.01) |
| *G09G 5/00* | (2006.01) |
| *H04N 5/14* | (2006.01) |

(Continued)

(52) U.S. Cl.
CPC .......... *H04N 5/2228* (2013.01); *G09G 5/005* (2013.01); *H04N 5/147* (2013.01); *H04N 5/2251* (2013.01); *H04N 5/23293* (2013.01); *H04N 5/772* (2013.01); *H04N 5/783* (2013.01); *H04N 7/013* (2013.01); *G09G 2310/02* (2013.01); *G09G 2360/02* (2013.01); *H04N 1/00129* (2013.01)

(58) Field of Classification Search
CPC .... H04N 5/783; H04N 7/013; H04N 1/00129; H04N 5/2228; H04N 5/23293; G09G 2340/0435; G09G 5/005
USPC ........................................ 386/224, 228, 230
See application file for complete search history.

(56) References Cited

U.S. PATENT DOCUMENTS

| | | |
|---|---|---|
| 4,876,596 A | 10/1989 | Faroudja |
| 5,796,439 A | 8/1998 | Hewett et al. |

(Continued)

FOREIGN PATENT DOCUMENTS

| | | |
|---|---|---|
| DE | 10043961 A1 | 4/2002 |
| EP | 0162311 A2 | 11/1985 |

(Continued)

*Primary Examiner* — Ngoc-Yen Vu
(74) *Attorney, Agent, or Firm* — Dinsmore & Shohl LLP

(57) ABSTRACT

A motion picture camera arrangement comprises a motion picture camera and a display device, wherein the motion picture camera has an image sensor for taking images at a variable frame rate and wherein the display device displays the taken images at a settable display rate. A method of operating the motion picture camera arrangement comprises the steps of: selecting a frame rate; determining a setting value for the display rate of the display device, wherein the setting value corresponds, in dependence on the selected frame rate, either to the selected frame rate or to a product or quotient of the selected frame rate and a whole-number multiplier or divisor; operating the image sensor at the selected frame rate; and operating the display device using the determined setting value for the display rate.

19 Claims, 3 Drawing Sheets

(51) Int. Cl.
  *H04N 5/225* (2006.01)
  *H04N 7/01* (2006.01)
  *H04N 5/77* (2006.01)
  *H04N 5/228* (2006.01)
  *H04N 1/00* (2006.01)

(56) References Cited

U.S. PATENT DOCUMENTS

| | | |
|---|---|---|
| 5,914,711 A | 6/1999 | Mangerson et al. |
| 6,111,610 A | 8/2000 | Faroudja |
| 7,015,965 B2 | 3/2006 | Asada et al. |
| 7,511,713 B2 | 3/2009 | Sadanand et al. |
| 7,710,468 B2 | 5/2010 | Uchida et al. |
| 8,149,288 B2 * | 4/2012 | Nakagomi ............ H04N 5/232 348/222.1 |
| 8,368,770 B2 * | 2/2013 | Glukhovsky ...... A61B 1/00009 348/22 |
| 8,488,043 B2 | 7/2013 | Murata et al. |
| 2003/0202119 A1 | 10/2003 | Masters |
| 2007/0091204 A1 | 4/2007 | Koshimizu et al. |
| 2007/0146810 A1 | 6/2007 | Kubo et al. |
| 2007/0242139 A1 | 10/2007 | Horita et al. |
| 2008/0051642 A1 * | 2/2008 | Krupnik ............ A61B 1/00009 600/302 |
| 2008/0068485 A1 * | 3/2008 | Yuyama ............ H04N 5/23293 348/333.01 |
| 2008/0297613 A1 | 12/2008 | Takahashi et al. |
| 2009/0147122 A1 | 6/2009 | Kato |
| 2010/0295970 A1 | 11/2010 | Suzuki |
| 2012/0133791 A1 | 5/2012 | Tokuyama |
| 2012/0200684 A1 | 8/2012 | Glukhovsky et al. |

FOREIGN PATENT DOCUMENTS

| | | |
|---|---|---|
| EP | 1471733 A1 | 10/2004 |
| JP | 11032241 | 2/1999 |
| JP | 2004221999 A | 8/2004 |
| WO | 9739487 A1 | 10/1997 |
| WO | 2007052902 A1 | 5/2007 |

\* cited by examiner

MOTION PICTURE CAMERA ARRANGEMENT AND METHOD OF OPERATING A MOTION PICTURE CAMERA ARRANGEMENT

CROSS-REFERENCE TO RELATED APPLICATIONS

This application claims priority of German Patent Application 102014102689.6 filed on Feb. 28, 2014.

FIELD OF THE INVENTION

The present invention relates to a method of operating a motion picture camera arrangement which comprises a motion picture camera and a display device, wherein the motion picture camera has an image sensor for taking images using a selectable, continuously or quasi-continuously variable frame rate, and wherein the display device displays, i.e. shows visually, the taken images at a display rate which can be set at least within a permitted range. The invention further relates to a corresponding motion picture camera arrangement.

BACKGROUND OF THE INVENTION

Such electronic motion picture cameras (also referred to as video cameras) can generate and record digital motion picture sequences and/or can transfer them to an external recording apparatus. To set and monitor the image section and/or camera parameters such as focus, focal length and exposure, an output of the generated images can take place at a display device, e.g. at an electronic viewfinder integrated into the motion picture camera and/or at an external viewfinder or monitor. The frame rate of the motion picture camera at which the image sensor is operated (i.e. at which the image information is detected and read out of the image sensor) can be freely selected within certain limits. The frame rate is also called the frame frequency. A frame rate of 24 frames per second (fps) is frequently selected to adapt the perceived impression presented to a viewer to that of motion picture movies produced with conventional moving picture cameras. With such analog moving picture cameras, a frame rate of 24 fps is typically preset, with the exposure time corresponding to half a frame period.

A display of the images taken by an electronic motion picture camera at a viewfinder or monitor at the same display rate, i.e. likewise 24 fps, can result in perceptible image flicker. A display of the taken images at a substantially higher display rate, for example approximately 100 fps, is therefore targeted.

As a rule, electronic motion picture cameras therefore have at least one buffer memory into which the respective images taken by the image sensor are written. The respective current image is periodically read from the buffer memory in accordance with the display rate of the display device and is displayed at the display device. Since in the named example, the display rate is higher than the frame rate, the reading out and displaying of a respective image stored in the buffer memory is therefore repeated several times before the next stored image is read out and displayed.

Different refresh rates in the presentation can arise with different images depending on the relationship between the frame rate and the display rate. With the above-named rates, the images are sometimes displayed at the display device four times after one another; occasionally, however, even five times after one another. A fivefold display takes place when no new image is yet available for display in the buffer memory after the end of the fourth display of an image. The resulting different display durations of the individual frames, i.e. the different display durations perceived by a viewer of the display device, can result in a jerky and less smooth perception. In addition, due to a constantly varying phasing between the image capture and the image display, an undesirably high delay can result between the taking of an image and the display of this image at the display device (so-called latency time). The camera work (e.g. punctual pan shot) is hereby made more difficult. This is in particular the case in the aforesaid example when the previously taken image still stored in the buffer memory is already being displayed a fifth time—briefly before a new image has been taken by the image sensor and is written to the buffer memory.

SUMMARY OF THE INVENTION

It is therefore the object of the present invention to provide an improved method of operating a motion picture camera arrangement and to provide a corresponding motion picture camera arrangement which allow a smooth display with minimized latency of the taken images at the display device.

The object is satisfied by a method of operating a motion picture camera arrangement which comprises a motion picture camera and a display device, wherein the motion picture camera has an image sensor for taking images at a selectable, continuously or quasi-continuously variable frame rate; and wherein the display device displays the taken images at a display rate settable at least within a permitted range, comprising the steps of:

selecting a frame rate of the image sensor;
  determining a setting value for the display rate of the display device, wherein the setting value corresponds, in dependence on the selected frame rate, either to the selected frame rate or to a product or quotient of the selected frame rate and a whole-number multiplier or divisor;
  operating the image sensor at the selected frame rate; and
  operating the display device using the determined setting value for the display rate.

A user of the motion picture camera arrangement, e.g. a cameraman or an assistant, freely selects a frame rate of the image sensor (i.e. a selection value for the frame rate of the image sensor) within certain range limits with the aid of an input device. This can be desired in accordance with artistic demands, for example for slow-motion pictures or for undercranking. A continuous selection of a desired value for the frame rate allows a continuous setting of the frame rate, in particular with an analog control. A quasi-continuous selection is understood as a selection in which very many different frame rate values, preferably more than, for example, 100 frame rate values, can be set and the possibly settable frame rate values lie closely next to one another. This means, with respect to the unit "fps" for example, that the user can select the frame rate with a precision of one or even more decimal places. A quasi-continuous selection is typically present in a digital control in which the resolution of the settable frame rate values is, for example, restricted by the quantization steps of an A/D converter. The frame rate or also the frame period duration reciprocal to the frame rate can in particular be varied in equidistant steps.

If the display rate of the display device is higher than the frame rate of the image sensor, the setting value for the display rate is determined as the product of the selected frame rate and of a whole-number multiplier (i.e. the selection value of the frame rate is multiplied by a whole number). If, however, the display rate should be lower than the frame rate (e.g. for extreme slow-motion shots), the setting value is determined as the quotient of the selected frame rate and of a whole-number divisor (i.e. the selection value of the frame rate is divided by a whole number). It is sufficient to implement the present invention if at least one of the two above-named alternatives is provided.

Since the frame rate of the image sensor and the display frequency of the display device are thus always in a whole-number relationship with one another, a synchronization of the image capture and of the image display is achieved, i.e. the display rate of the display device is always based on the frame rate of the image sensor selected by the user and the image capture and the image display have a constant phasing with respect to one another.

A multiplier of, for example, 4 would be selected for a frame rate of 24 fps so that the setting value for the display rate amounts to 96 fps. Due to the synchronicity of the two rates, each image written to the buffer memory will be read out from the buffer memory and displayed at the display device exactly four times. Since the phasing is constant, it is not necessary optionally to read out individual images from the buffer memory a fifth time because, for instance, a more current image is not available in good time due to a changed phasing.

Provision is made for this purpose that the display rate of the display device can be set fully variably at least within a permitted range, i.e. the display rate of the display device can also be set continuously or quasi-continuously variably. It is generally not precluded that the actually possible display rate range of the display device can also be larger than the permitted region. The rate range for the frame rate can, for example, lie between 1 and 250 fps and the permitted range for the display rate can lie between 80 and 160 fps, with the actually possible display rate range of the display device being able to lie e.g. between 10 and 200 fps. Such a fully variable adjustability of the display rate can be realized, for example, when the display device (internal or external viewfinder, monitor) comprises an LCD (liquid crystal display), an LCOS (liquid crystal on silicon) display or an OLED display.

After a desired value for the frame rate of the image sensor has been selected in the explained manner and a setting value has been determined for the display rate of the display device, the image sensor is operated at the selected frame rate during the capture of a motion picture sequence and the display rate of the display device is set to the determined setting value to operate the display device at the set display rate.

Due to the constant phasing between the image capture and the image display, a smooth display of the taken images at the display device is made possible and an image flicker is avoided or at least largely suppressed in dependence on the selected display rate. A constant latency time, that is a constant delay between the sensor exposure (taking of an image by means of the image sensor) and the display of the image at the display device, is furthermore also achieved due to the constant phasing. The latency time can hereby in particular be set to a favorable small value and (intermittently) long latency times due to a constantly varying phasing between the image capture and the image display are avoided.

The named method is used at least in those time periods in which the selected frame rate is constant. In the case of a change of the selection value for the frame rate during an ongoing taking of a motion picture sequence, the setting value for the display rate can, however, also temporarily differ from the value in accordance with the invention.

The term "image" in connection with the invention in particular designates a data set which represents the image information of an image detected by the image sensor. It is in this respect preferably a full image. The invention is, however, generally also used when the image information is detected and/or transferred in predefined parts, e.g. as half-images.

In accordance with a preferred embodiment of the invention, the multiplier or divisor is fixed (i.e. selected) in the determination of the setting value for the display rate such that the setting value lies within the permitted range of the display rate. It is thereby ensured that the display device is not operated at a display rate which lies outside the permitted range. In other words, which range should be observed for the display rate as a result of the explained multiplication or division is fixed by the named permitted range to ensure a smooth display of the image information without image flickering.

For example, the value for the frame rate selected by the user is multiplied by different whole-number multipliers and/or divided by different whole-number divisors by a control device of the motion picture camera, wherein the control device always checks whether the result lies within the predefined permitted range, and wherein, if this is the case, the result is directly used as the setting value for the display rate of the display device or is taken into account as the permitted setting value for a further check. In this respect, in particular the selected value for the frame rate can itself also be used as the setting value (corresponding to a multiplier or divisor of one), namely if the selected frame rate lies within the permitted range.

In accordance with an advantageous embodiment—if a plurality of possible setting values for the display rate lie within the permitted range (corresponding to a plurality of different whole number multipliers or divisors) for the frame rate selected by the user in accordance with the explained determination—that setting value is selected and set which lies closest to a predefined target rate. The target rate can be set such that an ideal flicker-free presentation is ensured. For example, the target rate can be 96 or 100 fps, with a target rate of 96 fps being ideal for the initially mentioned standard frame rate of 24 fps. Alternatively to this—if a plurality of possible setting values for the display rate are determined for the selected frame rate—the highest possible setting value within the permitted range can also be selected, for example.

A lower limit rate and an upper limit rate which bound the permitted range of the display rate advantageously differ by a factor of two. It is thereby ensured that a setting value which satisfies the condition in accordance with the invention can be determined for every possible frame rate.

In accordance with a further preferred embodiment, the lowest selectable frame rate of the image sensor is lower than the lower limit rate of the permitted range of the display rate, and/or the highest selectable frame rate of the image sensor is higher than the upper limit rate of the permitted range of the display rate.

The method furthermore advantageously comprises the steps:

writing a respective image taken by the image sensor to at least one buffer memory;

one-time or multiple reading out from the buffer memory of the respective image or of one of a plurality of images written after one another to the buffer memory and transferring the read out image to the display device; and displaying the transferred image by the display device, wherein the start of a first-time reading out of an image written to the buffer memory takes place at a point in time at which the writing of this image to the buffer memory has not yet been completed. In other words, the writing of a respective image and its first-time reading out take place overlapping in time. The explained latency time is thereby reduced and a sensible tracking of the image content or the carrying out of a pan shot is simplified for the user.

If the frame rate of the image sensor is lower than the display rate of the display device, a multiple reading from the buffer memory and a transferring of the respective image to the display device take place, in particular in accordance with the explained whole-number multiplier or divisor. If, in contrast, the frame rate is higher than the display rate (e.g. with extreme slow-motion shots), not every image taken by the image sensor is read from the buffer memory or is written to the buffer memory at all, i.e. not every image taken by the image sensor is presented at the display device.

The writing of an image to the buffer memory can generally already begin before the image sensor has been completely read out, for instance when the image sensor is read out linewise from top to bottom.

In an embodiment, the images taken by the image sensor are alternately written to a first buffer memory and to a second buffer memory, with the respective reading out of an image taking place for the purpose of a transfer to the display device from that buffer memory for which the writing of an image taken by the image sensor was last begun. Since therefore the newest image is always read from the buffer memory, the above-explained latency time is further reduced. In addition, a reading out of an image for the purpose of transfer to the display device can also take place at a point in time at which another image should just be read out of the image sensor and buffered.

The start of the reading out of a respective image from the buffer memory (only buffer memory or first or second buffer memory) advantageously takes place substantially simultaneously with the start of the writing of the image to the buffer memory if the period required for the writing of the image to the buffer memory is shorter (after the end of the exposure of the image sensor) than the period provided for the display of the image. Provided that therefore the readout time of the sensor (i.e. the time period for the writing of the image data to the buffer memory) is shorter than the time period for the display of the image at the display device (corresponding to the reciprocal value of the set display rate of the display device), the reading out of the image from the buffer memory can already take place directly after the start of the reading out of the image sensor or after the start of the writing of the image data to the buffer memory. The latency time is hereby minimized. The required time for the writing of the image to the buffer memory and the time for the displaying of the image at the display device can be determined (for example by the already named control device of the motion picture camera) for each current operating state of the motion picture camera and can be compared with one another to control the start of the reading out accordingly. In this connection, the term "substantially simultaneously" means that the start of the reading out follows on directly from the start of the writing as soon as the information written to the buffer memory is available.

Alternatively to this, the start of the reading out of a respective image from the buffer memory is delayed relative to the start of the writing of the image to the buffer memory such that the end of the reading out of the image from the buffer memory substantially coincides in time with the end of the writing of the image to the buffer memory if the time required for the writing of the image to the buffer memory is longer than the time provided for the display of the image. If therefore the readout time of the sensor or the time period for the writing of the image data to the buffer memory is longer than the time period for the display of the image at the display device (e.g. if the display device is operated at a very high display rate), the start of the readout of the image from the buffer memory is delayed by a suitable small time period relative to the start of the reading out of the image sensor or to the start of the writing of the image data to the buffer memory. The latency time is also hereby minimized. In this alternative embodiment, the required time for the writing of the image to the buffer memory and the time for the displaying of the image at the display device can also be determined (for example by the already named control device) for each current operating state of the motion picture camera and can be compared with one another to control the start of the reading out accordingly.

The object of the invention is furthermore satisfied by a motion picture camera arrangement comprising a motion picture camera, an input device, a display device and a control device, wherein the motion picture camera has an image sensor for taking images at a selectable, continuously or quasi-continuously variable frame rate, wherein the display device is adapted to display the taken images at a display rate settable at least within a permitted range, and wherein the control device is adapted to detect a frame rate of the image sensor selected by means of the input device;

to determine a setting value for the display rate of the display device on the basis of the selected frame rate, wherein the setting value corresponds, in dependence on the selected frame rate, either to the selected frame rate or to a product or quotient of the selected frame rate and a whole-number multiplier or divisor; and to operate the display device using the determined setting value for the display rate.

The named control device or a further control device operates the image sensor at the selected frame rate.

The advantageous embodiments explained in connection with the method in accordance with the invention can also be realized accordingly in the motion picture camera arrangement in accordance with the invention. Accordingly, in a corresponding advantageous embodiment, the control device can be adapted to carry out the respective method step or steps.

Further advantageous embodiments of the invention are named in the dependent claims, in the description and in the drawings.

BRIEF DESCRIPTION OF THE DRAWINGS

The invention will be described in the following with reference to an embodiment and to the drawings. There are shown.

DETAILED DESCRIPTION OF THE PREFERRED EMBODIMENTS

Figure 1:
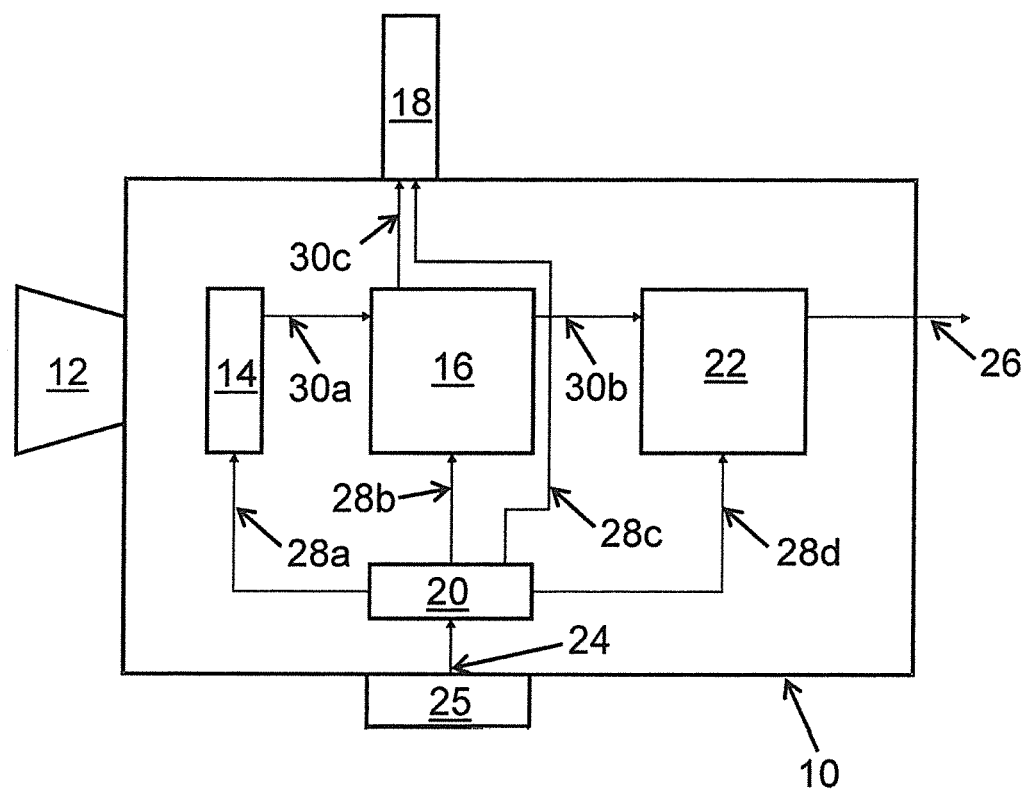
FIG. 1 a block diagram of a motion picture camera arrangement in accordance with the invention.

FIG. 1 schematically shows a motion picture camera arrangement having a motion picture camera 10 at which a display device 18, for example an electronic viewfinder, is provided. Alternatively or additionally to an electronic viewfinder, the display device 18 can have an external monitor which does not have to be fixedly connected to the motion picture camera 10. The display device 18 (electronic viewfinder or external monitor) can display the received image data at a display rate which is fully variably settable within a predefined permitted range. For this purpose, the display device 18 can, for example have an LCD (liquid crystal display), an LCOS (liquid crystal on silicon) display or an OLED (organic light-emitting diode) display.

The motion picture camera 10 comprises an objective 12 which images the images to be taken onto an image sensor 14. The image sensor 14 can be operated at a fully variable frame rate selectable by the user to capture motion picture sequences. The images taken by the image sensor 14 (i.e. the image data generated by the image sensor 14) can be written to a buffer memory 16 via an image data line 30a. In accordance with a modification, not shown, instead of the single buffer memory 16, two or more buffer memories can also be provided to which the image data of two images taken after one another are alternately written.

The image data stored in the buffer memory 16 can be read out of it and can be transferred via a data line 30c to the display device 18 and via a data line 30b to an image processing device 22 which is adapted to process image data in a manner known per se. The image data processed by the image processing device 22 can be output at a data output 26. Alternatively or additionally, the image data can be written to an image data memory (not shown) within the motion picture camera 10.

The motion picture camera 10 furthermore has a control device 20 which is adapted to transmit control commands via a control line 28a to the image sensor 14, via a control line 28b to the buffer memory 16, via a control line 28c to the display device 18 and via a control line 28d to the image processing device 22.

The control device 20 furthermore has a control input 24 to which an input device 25 is connected. The user can input a selection value for the frame rate of the image sensor 14 via the input device 25.

An image taken by the image sensor 14 is read out from the image sensor 14 directly after the end of the exposure time and is transferred to the buffer memory 16. Depending on the selected frame rate of the image sensor 14 and on the set display rate of the display device 18, each image is, for example, read out several times from the buffer memory 16, is transferred to the display device 18 and is presented there, namely provided the frame rate is lower than the display rate. If the frame rate is equal to the display rate, each image is read from the buffer memory 16 exactly one time, is transferred to the display device 18 and is presented there. If the frame rate is higher than the display rate, only every nth image taken by the image sensor 14 is read from the buffer memory 16 and is presented at the display device 18, with the number n corresponding to the whole number ratio between the frame rate and the display rate.

The rate range for the frame rate of the image sensor 14 can amount, for example, to 1 to 250 fps. The setting of the frame rate can take place continuously or quasi-continuously.

The permitted range for the display rate of the display device 18 amounts, for example, to 80 to 160 fps, with the display device 18 generally also being able to be controlled for higher or lower display rates. The limit values of the permitted range can be stored, for example, in the control device 20. It is also conceivable that the limit values are stored in the display device 18 and can be automatically transferred to the control device 20.

The control device 20 is adapted to determine a setting value for the display rate of the display device 18, wherein the setting value corresponds, in dependence on the selected frame rate of the image sensor 14, either to the selected frame rate or to a product or quotient of the selected frame rate and a whole-number multiplier or divisor. The control device 20 transfers the determined setting value via the control line 28c to the display device 18 to set the display rate of the display device 18 to the determined setting value.

If, for example, a frame rate of 96 fps was selected, 96 fps likewise results as the setting value for the display frequency.

For a frame rate of, for example 48 fps and with the above-named permitted range for the display rate (80 to 160 fps), a plurality of setting values in contrast result for the display rate, namely 96 fps for a multiplier of 2 and 144 fps for a multiplier of 3.

For this case, the control device 20 is adapted to make a selection. A target frequency, for example 100 fps, can be stored in the control device 20, with the target rate being able to be both fixedly saved and settable. The setting of the target rate can take place, for example, by a user input or also automatically in dependence on the connected display device 18. The control device 20 now selects that one of the possible setting values which is closest to the target frequency.

The control device 20 will select a setting value for the display rate of 96 fps for the named example values since this setting value is closer to the target rate of 100 fps than the setting value of 144 fps.

Alternatively, a selection of the setting value could also take place such that the highest possible frequency is always selected within the permitted range, in this present case, therefore 144 fps.

If the frame rate is fixed at 180 fps in a further example, a setting value for the above-named permitted range (80 to 160 fps) of 90 fps results, based on a division of the frame rate of 180 fps by a quotient of 2.

Figure 2:
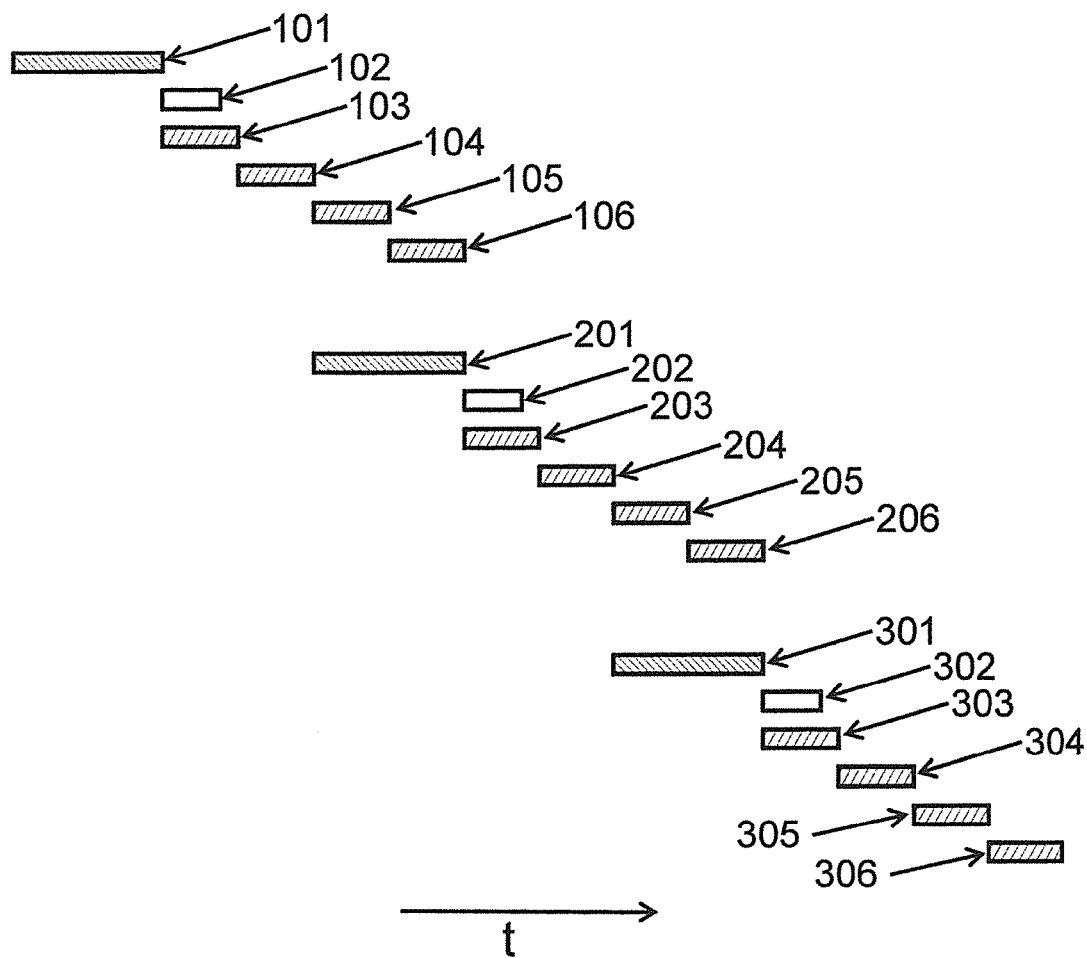
FIG. 2 a flowchart of the method in accordance with the invention in accordance with a first embodiment.

The progression of the different method steps is shown by way of example over the time t for three successive images in FIG. 2. For this example, a frame rate of the image sensor 14 of 24 fps was selected and a display rate of the display device 18 of 96 fps was selected. The exposure time amounts to $\frac{1}{48}$ second. Each image recorded by the image sensor 14 and written to the buffer memory 16 is accordingly read out from the buffer memory 16 four times in succession, is transferred to the display device 18 and is presented by it.

In a first exposure step 101, the taking of a first image takes place by an exposure of the image sensor 14 at the predefined exposure time ($\frac{1}{48}$ second). A sensor readout step 102 follows on directly from this in which the image data are read out of the image sensor 14 and are written to the buffer memory 16. A first presentation step 103 starts substantially simultaneously with the sensor readout step 102 and the buffered image data are read from the buffer memory 16 at said first presentation step, are transferred to the display device 18 and are presented by it. A corresponding second presentation step 104 which is in turn directly followed by a third presentation step 105 takes place directly after the end of the first presentation step 103. The presentation of the first image ends with the end of a fourth presentation step 106 following directly on from the third presentation step 105. Each presentation step 103 to 106 lasts $\frac{1}{96}$ second in accordance with the display rate.

A second exposure step 201 for exposing the image sensor 14 to a second image starts substantially simultaneously with the start of the third presentation step 105. The second exposure step 201 ends substantially simultaneously with the end of the fourth presentation step 106. A sensor readout step 202 in turn follows on directly from the second exposure step 201. As in the preceding cycle, further first to fourth presentation steps 203, 204, 205, 206 for presenting the second image on the display device 18 follow on from the second exposure step 201, with the first presentation step 203 starting substantially simultaneously with the sensor readout step 202.

A further cycle starts after the end of the second presentation step 204 at the start of a third exposure step 301 for exposing the image sensor 14 to a third image. A sensor readout step 302 and four presentation steps 303, 304, 305, 306 follow on from the third exposure step 301 in a corresponding manner.

Since the respective four presentation steps 103 to 106, 203 to 206, 303 to 306 last 1/24 second (4×1/96 second) in total and thus correspond exactly to the period time of an image capturing cycle, the image capture and the image display run synchronously with one another. The latency time, i.e. the delay between the taking of an image and its first-time display at the display device 18, remains constant, just like the number of image refreshes of a respective image.

As can be recognized in FIG. 2, the sensor read out steps 101, 202, 302 have a shorter time period than the presentation steps 103, 203, 303. The presentation steps 103, 203, 303 can therefore start substantially simultaneously with the sensor readout steps 102, 202, 302. The latency time is minimized by this control of the phasing between the respective sensor readout step 102, 202, 302 and the first presentation step 103, 203, 303.

Figure 3:
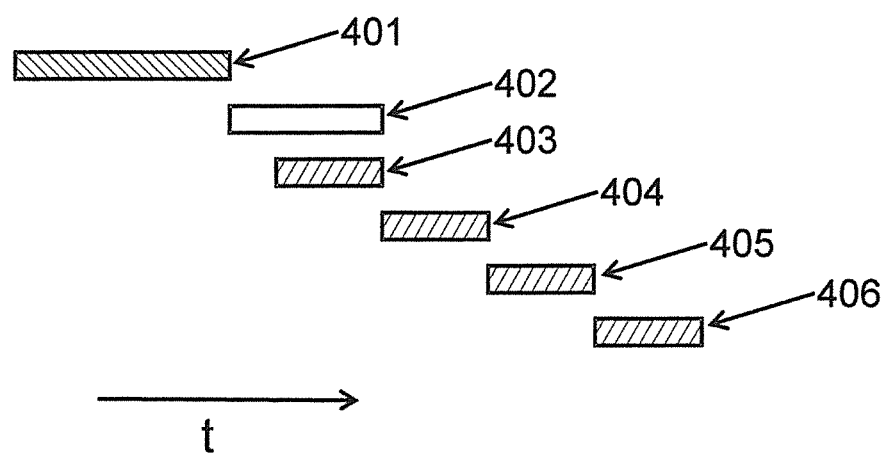
FIG. 3 a flowchart of the method in accordance with the invention in accordance with a second embodiment.

In FIG. 3, unlike FIG. 2, the progression of the method steps is shown over the time t for the case that the sensor readout step 402 has a longer time period than the presentation step 403, with here only a single image capturing cycle being shown. The first presentation step 403 starts a little later than the sensor readout step 402. The delay is selected by the control device 20 so that the first presentation step 403 and the sensor readout step 402 end substantially simultaneously. It is ensured by this control of the phasing between the sensor readout step 402 and the first presentation step 403 that the image data can be read out from the buffer memory 16 without interruption during the presentation step 403. The latency time is hereby in turn minimized.

The invention claimed is:

1. A method of operating a motion picture camera arrangement which comprises a motion picture camera and a display device, wherein the motion picture camera has an image sensor for taking images at a selectable, continuously or quasi-continuously variable frame rate; and wherein the display device displays the taken images at a display rate settable at least within a permitted range, comprising the steps of:
   selecting frame rate of the image sensor;
   determining a setting value for the display rate of the display device, wherein the setting value corresponds, in dependence on the selected frame rate, either to the selected frame rate or to a product or quotient of the selected frame rate and a whole-number multiplier or divisor;
   operating the image sensor at the selected frame rate;
   operating the display device using the determined setting value for the display rate; and
   writing a respective image taken by the image sensor to at least one buffer memory,
   wherein the multiplier or divisor is fixed such that the setting value for the display rate lies within the permitted range of the display rate.

2. The method in accordance with claim 1,
   wherein, if a plurality of possible setting values for the selected frame rate are determined for the display rate, that setting value is selected which is closest to a predefined target rate.

3. The method in accordance with claim 1,
   wherein a lower limit rate and an upper limit rate which bound the permitted range of the display rate differ by a factor of two.

4. The method in accordance with claim 1, wherein a lowest selectable frame rate of the image sensor is lower than a lower limit rate of the permitted range of the display rate.

5. The method in accordance with claim 1,
   wherein a highest selectable frame rate of the image sensor is higher than an upper limit rate of the permitted range of the display rate.

6. The method in accordance with claim 1,
   further comprising the steps:
      one-time or multiple reading out from the buffer memory of the respective image or of one of a plurality of images written after one another to the buffer memory and transferring the read out image to the display device; and
      displaying the transferred image by the display device,
   wherein the start of a first-time reading out of an image written to the buffer memory takes place at a point in time at which the writing of this image to the buffer memory has not yet been completed.

7. The method in accordance with claim 6,
   wherein the images taken by the image sensor are alternately written to a first buffer memory and to a second buffer memory, wherein for the purpose of the transfer to the display device a respective image is read out from that buffer memory for which the writing of an image taken by the image sensor was last begun.

8. The method in accordance with claim 6,
   wherein the start of the reading out of a respective image from the buffer memory takes place substantially simultaneously with the start of the writing of the image to the buffer memory, if the time required for the writing of the image to the buffer memory is shorter than the time provided for the display of the image.

9. The method in accordance with claim 6,
   wherein the start of the reading out of a respective image from the buffer memory is delayed relative to the start of the writing of the image to the buffer memory such that the end of the reading out of the image from the buffer memory substantially coincides in time with the end of the writing of the image to the buffer memory, if the time required for the writing of the image to the buffer memory is longer than the time provided for the display of the image.

10. A motion picture camera arrangement, comprising a motion picture camera, an input device, a display device and a control device, wherein the motion picture camera has an image sensor for taking images at a selectable, continuously or quasi-continuously variable frame rate, wherein the display device is adapted to display the taken images at a display rate settable at least within a permitted range, and wherein the control device is adapted to detect a selected frame rate of the image sensor selected by means of the input device;
determine a setting value for the display rate of the display device on the basis of the selected frame rate, wherein the setting value corresponds, in dependence on the selected frame rate, either to the selected frame rate or to a product or quotient of the selected frame rate and a whole-number multiplier or divisor; and
operate the display device using the determined setting value for the display rate,
comprising at least one buffer memory, wherein the control device is adapted to write a respective image taken by the image sensor to the buffer memory,
wherein the control device is adapted to fix the multiplier or the divisor such that the setting value for the display rate lies within the permitted region of the display rate.

11. The motion picture camera arrangement in accordance with claim 10,
wherein, if a plurality of possible setting values for the display rate are determined for the selected frame rate, the control device is adapted to select that setting value which is closest to a predefined target rate.

12. The motion picture camera arrangement in accordance with claim 10,
wherein the control device is adapted to
read out the respective image or one of a plurality of images written to the buffer memory after one another once or several times from the buffer memory and to transfer it to the display device;
wherein the start of a first-time reading out of an image written to the buffer memory takes place at a point in time at which the writing of this image to the buffer memory has not yet been completed.

13. The motion picture camera arrangement in accordance with claim 12,
wherein the control device is adapted to control the writing of the images to the buffer memory and the reading out of the images from the buffer memory such that the start of the reading out of a respective image from the buffer memory takes place substantially simultaneously with the start of the writing of the image to the buffer memory, if the time required for the writing of the image to the buffer memory is shorter than the time provided for the display of the image.

14. The motion picture camera arrangement in accordance with claim 12,
wherein the control device is adapted to control the writing of the images to the buffer memory and the reading out of the images from the buffer memory such that the start of the reading out of a respective image from the buffer memory is delayed relative to the start of the writing of the image to the buffer memory such that the end of the reading of the image from the buffer memory coincides substantially in time with the end of the writing of the image to the buffer memory, if the time required for the writing of the image to the buffer memory is longer than the time provided for the display of the image.

15. A method of operating a motion picture camera arrangement which comprises a motion picture camera and a display device, wherein the motion picture camera has an image sensor for taking images at a selectable, continuously or quasi-continuously variable frame rate; and wherein the display device displays the taken images at a display rate settable at least within a permitted range, comprising the steps of:
selecting a frame rate of the image sensor;
determining a setting value for the display rate of the display device, wherein the setting value corresponds, in dependence on the selected frame a either to the selected frame rate or to a product or quotient of the selected frame rate and a whole-number multiplier or divisor;
operating the image sensor at the selected frame rate;
operating the display device using the determined setting value for the display rate; and
writing a respective image taken by the image sensor to at least one buffer memory,
wherein a lower rate and an upper limit rate which bound the permitted range of the display rate differ by a factor of two.

16. A method of operating a motion picture camera arrangement which comprises a motion picture camera and a display device, wherein the motion picture camera has an image sensor for taking images at a selectable, continuously or quasi-continuously variable frame rate; and wherein the display device displays the taken images at a display rate settable at least within a permitted range, comprising the steps of:
selecting a frame rate of the image sensor;
determining a setting value for the display rate of the display device, wherein the setting value corresponds, in dependence on the selected frame rate, either to the selected frame rate or to a product or quotient of the selected frame rate and a whole-number multiplier or divisor;
operating the image sensor at the selected frame rate;
operating the display device using the determined setting value for the display rate; and
writing a respective image taken by the image sensor to at least one buffer memory,
wherein a lowest selectable frame rate of the image sensor is lower than a lower limit rate of the permitted range of the display rate.

17. A method of operating a motion picture camera arrangement which comprises a motion picture camera and a display device, wherein the motion picture camera has an image sensor for taking images at a selectable, continuously or quasi-continuously variable frame rate; and wherein the display device displays the taken images at a display rate settable at least within a permitted range, comprising the steps of:
selecting a frame rate of the image sensor;
determining a setting value for the display rate of the display device, wherein the setting value corresponds, in dependence on the selected frame rate, either to the selected frame rate or to a product or quotient of the selected frame rate and a whole-number multiplier or divisor;
operating the image sensor at the selected frame rate;
operating the display device using the determined setting value for the display rate; and
writing a respective image taken by the image sensor to at least one buffer memory,
wherein a highest selectable frame rate of the image sensor is higher than an upper limit rate of the permitted range of the display rate.

18. A method of operating a motion picture camera arrangement which comprises a motion picture camera and a display device, wherein the motion picture camera has an image sensor for taking images at a selectable, continuously or quasi-continuously variable frame rate; and wherein the display device displays the taken images at a display rate settable at least within a permitted range, comprising the steps of:
  selecting a frame rate of the image sensor;
  determining a setting value for the display rate of the display device, wherein the setting value corresponds, in dependence on the selected frame rate, either to the selected frame rate or to a product or quotient of the selected frame rate and a whole-number multiplier or divisor;
  operating the image sensor at the selected frame rate;
  operating the display device using the determined setting value for the display rate;
  writing a respective image taken by the image sensor to at least one buffer memory;
  one-time or multiple reading out from the buffer memory of the respective image or of one of a plurality of images written after one another to the buffer memory and transferring the read out image to the display device; and
  displaying the transferred image by the display device,
  wherein the start of a first-time reading out of an image written to the buffer memory takes place at a point in time at which the writing of this image to the buffer memory has not yet been completed.

19. A motion picture camera arrangement, comprising a motion picture camera, an input device, a display device and a control device, wherein the motion picture camera has an image sensor for taking images at a selectable, continuously or quasi-continuously variable frame rate, wherein the display device is adapted to display the taken images at a display rate settable at least within a permitted range, and wherein the control device is adapted to
  detect a selected frame rate of the image sensor selected by means of the input device;
  determine a setting value for the display rate of the display device on the basis of the selected frame rate, wherein the setting value corresponds, in dependence on the selected frame rate, either to the selected frame rate or to a product or quotient of the selected frame rate and a whole-number multiplier or divisor; and
  operate the display device using the determined setting value for the display rate;
  further comprising at least one buffer memory,
  wherein the control device is adapted to
  write a respective image taken by the image sensor to the buffer memory; and
  read out the respective image or one of a plurality of images written to the buffer memory after one another once or several times from the buffer memory and to transfer it to the display device;
  wherein the start of a first-time reading out of an image written to the buffer memory takes place at a point in time at which the writing of this image to the buffer memory has not yet been completed.

* * * * *